United States Patent [19]
Tomozawa et al.

[11] Patent Number: 5,459,635
[45] Date of Patent: Oct. 17, 1995

[54] LAMINATED THIN FILM CAPACITOR AND METHOD FOR PRODUCING THE SAME

[75] Inventors: Atsushi Tomozawa, Osaka; Eiji Fujii, Yawata; Hideo Torii, Higashiosaka; Masumi Hattori, Hirakata; Satoru Fujii, Takatsuki; Ryoichi Takayama, Suita, all of Japan

[73] Assignee: Matsushita Electric Industrial Co., Ltd., Japan

[21] Appl. No.: 215,816

[22] Filed: Mar. 22, 1994

[30] Foreign Application Priority Data

Mar. 25, 1993 [JP] Japan ................................. 5-066316
Oct. 8, 1993 [JP] Japan ................................. 5-252683

[51] Int. Cl.$^6$ ................................................ H01G 4/10
[52] U.S. Cl. ........................... 361/321.5; 361/321.4; 361/321.1; 361/311
[58] Field of Search ........................... 361/311, 312, 361/313, 321.1, 321.2, 321.3, 321.4, 321.5, 322; 365/145; 257/295; 427/255.3, 126.2, 126.3, 79–81

[56] References Cited

U.S. PATENT DOCUMENTS

| | | | |
|---|---|---|---|
| 3,686,591 | 8/1972 | Gikow | 361/329 |
| 3,740,624 | 6/1973 | McAdams, Jr. et al. | |
| 4,017,885 | 4/1977 | Kendall et al. | |
| 4,297,773 | 11/1981 | Galvagni | |
| 4,531,268 | 7/1985 | Rayburn | |
| 4,587,041 | 5/1986 | Uedaira et al. | 361/311 |
| 4,661,884 | 4/1987 | Seaman | |
| 5,144,529 | 9/1992 | Takahashi | |
| 5,204,314 | 4/1993 | Kirlin et al. | 427/255.3 |
| 5,326,721 | 7/1994 | Summerfelt | 437/131 |
| 5,350,606 | 9/1994 | Takada et al. | 427/255.3 |

FOREIGN PATENT DOCUMENTS

| | | |
|---|---|---|
| 4317719A1 | 12/1993 | Germany . |
| 3-34506 | 2/1991 | Japan ................................. 361/321.1 |
| 3-200308 | 9/1991 | Japan ................................. 361/311 |
| 4-206309 | 7/1992 | Japan . |
| 4-240197 | 8/1992 | Japan . |
| 2242784A | 10/1991 | United Kingdom . |

OTHER PUBLICATIONS

"Preparation and Properties of (Ba,Sr)TiO$_3$ Thin Films by RF Magnetron Sputtering", Ichinose et al. Jpn. J. Appl. Phys. vol. 32, Part 1, No. 9B, pp. 4115–4117, Sep. 1993.

"Excimer laser ablated barium strontium titanate thin films for dynamic random access memory applications" Roy et al., Appl. Phys. Letters., vol. 62 No. 10, Mar. 8, 1993 pp. 1056–1058.

"A stacked capacitor with (Ba$_x$Sv$_{1-x}$)TiO$_3$ for 256M DRAM" Koyama et al. IEDM, Dec. 1991 pp. 32.1.1–32.1.4.

"Electronic Ceramics," No. 103, pp. 57–58 (1990) (Partial English translation of p. 57, second col., line 1, to p. 58, first col. line 6).

Primary Examiner—Teresa J. Walberg
Assistant Examiner—Gregory L. Mills
Attorney, Agent, or Firm—Wenderoth, Lind & Ponack

[57] ABSTRACT

A laminated thin film capacitor having a substrate, at least two electrode layers, at least one dielectric layer and a pair of external electrode which are placed on respective side walls of the capacitor, wherein the metal electrode layer and the dielectric layers are laminated alternately on the substrate, and every other metal electrode layers are exposed on each of side walls of the capacitor, which capacitor is excellent in dielectric properties such as a high capacity per unit volume.

4 Claims, 2 Drawing Sheets

LAMINATED THIN FILM CAPACITOR AND METHOD FOR PRODUCING THE SAME

BACKGROUND OF THE INVENTION

1. Field of the Invention

The present invention relates to a laminated thin film capacitor and a method for producing the same.

2. Description of the Related Art

Barium titanate ($BiTaO_3$) having a perovskite crystal structure is widely used as a capacitor material since it is excellent in dielectric properties and has a high resistivity. Since barium titanate is characterized in that its dielectric constant in the a axis is larger than that in the c axis which is a polarization axis, it can provide a capacitor having good dielectric properties when its a axis is orientated preferentially in a direction perpendicular to a plane of an electrode, that is, in the (100) plane.

Strontium titanate ($SrTiO_3$) having a perovskite crystal structure is a cubic system crystal and paradielectric at a temperature of about 110 K. or higher. While a ceramic comprising $SrTiO_3$ has a lower dielectric constant than a ceramic comprising $BaTiO_3$ having the same crystal structure, the former has better temperature characteristics and smaller dielectric loss than the latter. When a Curie temperature is shifted by the addition of a shifter such as barium to $SrTiO_3$, a ceramic which is paradielectric and has a high dielectric constant at room temperature is obtained. This kind of ceramic is extensively used in a capacitor for high frequency and high voltage.

A composite perovskite structure compound having a composition of $Pb[(Mg_{1/3}Nb_{2/3})_{1-x}Ti_x]$ which is a composite material of $Pb(Mg_{1/3}Nb_{2/3})$ being one of typical relaxation type ferrodielectric materials and lead titanate ($PbTiO_3$) having the same perovskite crystal structure as $BaTiO_3$ or $SrTiO_3$ has a larger specific dielectric constant and better direct current bias characteristics than a $BaTiO_3$ type ferrodielectric material. Therefore, this composite perovskite structure compound is used in a small laminated capacitor having a large capacity.

To accommodate a capacitor to miniaturization and high density loading of an electronic device, down-sizing and increase of capacity of a chip capacitor are being progressed. Increase of the capacity can be achieved by the use of a dielectric material having a large dielectric constant or increase of the number of laminated layers by making each dielectric layer thin. For example, a method for producing a laminated ceramic capacitor is described in Electronic Ceramics, No. 103 (1990) pages 57–61. The disclosed method for laminating dielectric layers and metal electrode layers is as follow:

Powder of a dielectric material such as $BaTiO_3$ is compounded, mixed and dried. A slurry of the dielectric material powder is prepared and formed in a thin film sheet. An internal electrode paste of an electrode material such as palladium is printed on the sheet. These steps are repeated for determined times to alternately laminate the internal electrodes and the sheets. Thereafter, the laminate is cut to a desired size, and heated, whereby the ceramic and the metal are simultaneously sintered.

However, in the above lamination method, there is a limitation on a thickness of the dielectric layer. That is, since a particle size of the dielectric material powder which is a raw material of the dielectric layer is about 1 µm, some problems arise in evenness of the film thickness or insulation between the electrodes when the dielectric layer having a thickness of 3 µm or less is formed by preparing the slurry of the powder, making the sheet from the slurry and sintering the sheet. To produce a chip capacitor having the large capacity, the number of laminated layers should be increased. However, when the number of laminated layers is increased, a size of a chip is enlarged and the number of production steps increases, so that the reliability of the capacitor may be deteriorated. In addition, since the sintering step is necessary after the lamination in the above method and the sintering temperature is as high as about 1200° C., an electrode material is limited to a high melting point metal such as platinum.

Accordingly, a method for producing a laminated capacitor having good characteristics at a low temperature has been sought.

SUMMARY OF THE INVENTION

An object of the present invention is to provide a novel laminated thin film capacitor and a method for producing the same.

Another object of the present invention is to decrease a size of a chip capacitor while increasing its capacity.

A further object of the present invention is to provide a method for easily forming a dielectric thin layer of a laminated thin film capacitor at a low temperature.

To achieve the above objects, the present invention first forms a pattern of a metal electrode layer on a substrate by vacuum deposition or sputtering. On the formed electrode pattern, a film of a perovskite oxide such as $BaTiO_3$, $SrTiO_3$ or $(Ba_{1-x}Sr_x)TiO_3$ or a film of a composite perovskite compound of $Pb[(Mg_{1/3}Nb_{2/3})_{1-x}Ti_x]$ which is preferentially orientated in the (100) plane is formed in a thickness of 0.05 to 3 µm by a plasma CVD method which utilizes activity of plasma and the CVD reaction. The above steps are repeated to laminate the metal electrode layers and the dielectric layers alternately. Then, the laminate is cut to a predetermined size, and external electrodes are formed on both cut surfaces by vacuum deposition, sputtering, plating, coating-baking to obtain the laminated thin film capacitor.

In the above method of the present invention, since the plasma CVD method is used in the formation of the dielectric layers, the dense thin film of $(Ba_{1-x}Sr_x)TiO_3$ being preferentially orientated in the a axis direction or $Pb[(Mg_{1/3}Nb_{2/3})_{1-x}Ti_x]O_3$ both of which have good dielectric properties can be formed on the metal electrode layer at a lower temperature than the sintering temperature of a bulk or the temperature in other film formation methods such as vacuum deposition, sputtering and thermal CVD.

Since the metal electrode layer is formed by vacuum deposition or sputtering, the dense metal electrode layer having a thickness of 0.01 to 0.2 µm can be formed.

Since each layer has a thickness smaller than that formed from the slurry in the conventional laminated ceramic capacitor, a capacity of each dielectric layer can be made larger. In addition, the number of laminated layers in the same chip thickness can be increased. Consequently, an electrostatic capacity per unit volume is made large, so that the laminated thin film capacitor accommodating to the down-sizing and the capacity increase.

DETAILED DESCRIPTION OF THE INVENTION

The present invention will be explained in detail by making reference to the accompanying drawings.

EXAMPLE 1

Figure 1:
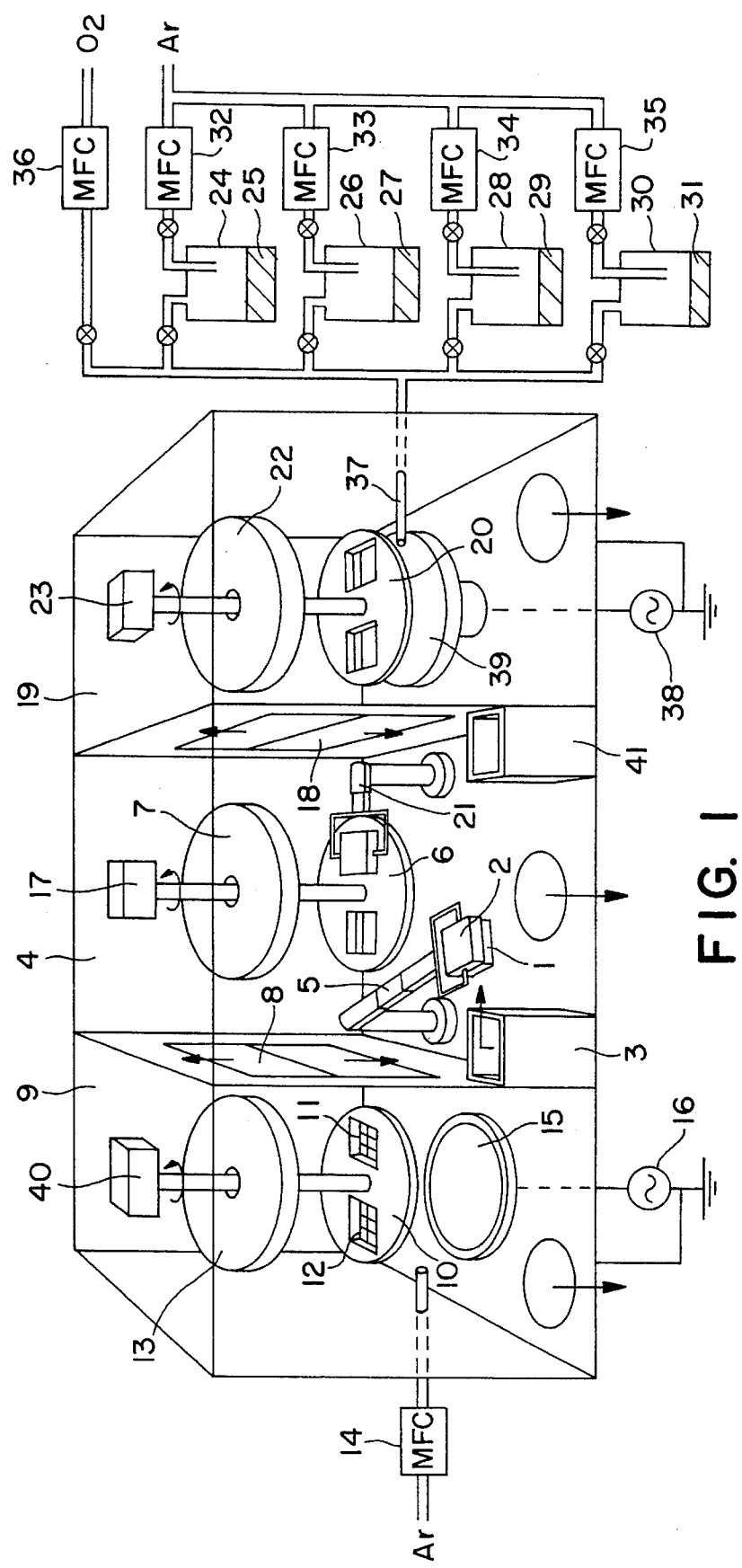
FIG. 1 shows an apparatus for producing a laminated thin film capacitor, which comprises a plasma CVD unit for forming the dielectric layers and a sputtering unit for forming the metal electrode layers.

FIG. 1 shows an apparatus for producing a laminated thin film capacitor, which comprises a plasma CVD unit for forming the dielectric layers and a sputtering unit for forming the metal electrode layers.

The apparatus of FIG. 1 comprises a substrate-fixing plate 2 on which a base substrate 1 is held, a pre-evacuating room 3, a pre-heating room 4, a transfer arm 5, a substrate holder 6, a lamp heater 7, a gate 8, a sputtering chamber 9, a substrate holder 10, metal masks 11 and 12, a lamp heater 13, a mass flow controller 14, a target 15, a high frequency power source 16 (13.56 MHz), a motor 17 for rotating the substrate holder 6, a gate 18, a plasma CVD chamber 19, a substrate holder 20, a transfer arm 21, a motor for rotating the substrate holder 20, evaporation vessels 24, 26, 28 and 30, raw materials 25, 27, 29 and 31, mass flow controllers 32, 33, 34, 35 and 36, a nozzle 37 for supplying raw material gases and reaction gas, a high frequency power source 38 (13.56 MHz), an electrode 39, a motor 40 for rotating the substrate holder 10, and a pre-evacuating room 41.

Figure 2B:
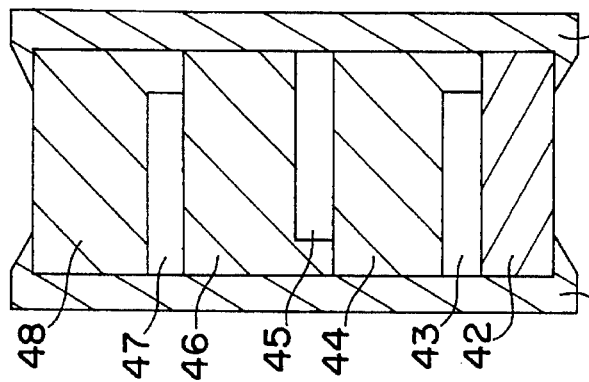
FIG. 2A and 2B are cross sectional schematic view of one example of the laminated thin film capacitor according to the present invention.
Figure 2A:
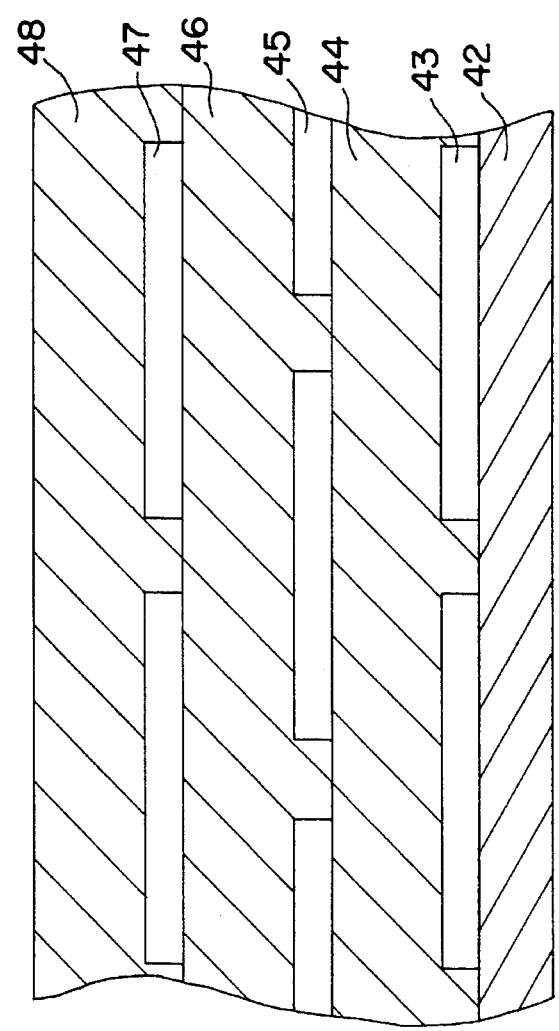

In FIG. 2, the laminated thin film capacitor of the present invention comprises a base substrate 42, metal electrode layers 43, 45 and 47, dielectric layers 44, 46 and 48, and external electrodes 49 and 50.

Figure 3:
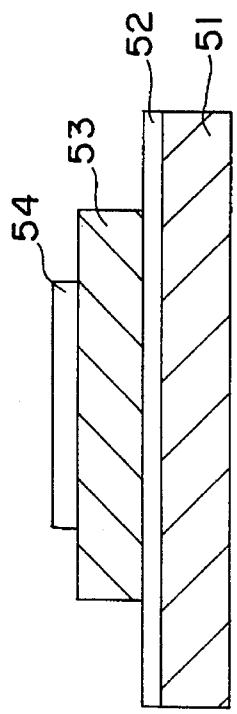
FIG. 3 is a cross sectional schematic view of a sample of the laminated thin film capacitor according to the present invention for property analysis.

In FIG. 3, the laminated thin film capacitor comprises a base substrate 51, metal electrode layers 52 and 54, and a dielectric layer 53.

The method for producing the laminated thin film capacitor according to the present invention will be explained.

The substrate-fixing plate 2, on which the base substrate 1 made of alumina (sizes: 50 mm×50 mm×0.3 mm) is held, is transferred in the evacuated pre-heating room 4 via the pre-evacuating room 3. The substrate-fixing plate 2 is transferred onto the substrate holder 6 by the transfer arm 5, and the substrate holder 6 is heated to 650° C. by the lamp heater 7. After heating, the gate 8 is opened, and the substrate-fixing plate 2 is transferred by the transfer arm 5 onto the substrate holder 10 in the sputtering chamber 9. To the substrate holder 10, two metal masks 11 and 12 are attached, and the two patterns of the metal electrode films as shown in FIG. 2 are alternately formed using the two masks alternately. Each metal mask has a size of 6.0 mm×1.2 mm.

First, the substrate-fixing plate is placed on the metal mask 11, and the base substrate 1 is intimately contacted to the metal mask 11. The substrate holder 10 is beforehand heated to 650° C. by the lamp heater 13. The gate 8 is closed, and the sputtering chamber 9 is evacuated to 1×10$^{-4}$ Pa. Thereafter, argon gas is supplied in the sputtering chamber 9 with controlling a flow rate by the mass flow controller 14. While maintaining the internal pressure in the sputtering chamber at 1 Pa, plasma (power of 0.8 W/cm$^2$) is generated on the nickel target 15 by the high frequency power source 16 (13.56 MHz) to form the patterned nickel metal electrode layer 43 on the base substrate 1. Since a film forming rate of the nickel film by this sputtering is about 0.01 μm/min., the metal electrode layer 43 having the thickness of about 0.05 μm is formed by 5 minutes sputtering. After film formation, supply of the argon gas is stopped, the gate 8 is opened, and the substrate-fixing plate 2 is transferred on the substrate holder 6 by the transfer arm 5. The substrate holder 6 is half turned by the motor 17 so that the substrate-fixing plate 2 is transferred on the side of gate 18.

Thereafter, the gate 18 is opened, and the substrate-fixing plate 2 is transferred on the substrate holder 20 in the plasma CVD chamber 19 by the transfer arm 21. The substrate holder 20 is beforehand heated to 650° C. by the lamp heater 22. Then, the gate 18 is closed, the plasma CVD chamber 19 is evacuated to 1 Pa, and the substrate holder 20 is rotated at 120 rpm by the motor 23. In the evaporation vessels 24, 26 and 28, the raw material 25 (barium dipivaloylmethane: Ba($C_{11}H_{19}O_2$)$_2$), the raw material 27 (isopropoxytitanium: Ti($C_3H_7O$)$_4$), and the raw material 29 (strontium dipivaloylmethane: Sr($C_{11}H_{19}O_2$)$_2$) are beforehand charged, respectively and heated to and maintained at 230° C., 50° C. and 240° C., respectively.

Vapors of Ba($C_{11}H_{19}O_2$)$_2$, Ti($C_3H_7O$)$_4$ and Sr($C_{11}H_{19}O_2$)$_2$ are supplied into the plasma CVD chamber by flowing the argon carrier gas in the evaporation vessels 24, 26 and 28 respectively by adjusting the flow rates of the carrier gas at 50 cm$^3$/min., 30 cm$^3$/min. and 40 cm$^3$/min. respectively by the mass flow controllers 32, 33 and 34, respectively. Further, the reaction gas (oxygen gas) is supplied into the plasma CVD chamber 19 by adjusting its flow rate at 50 cm$^3$/min. by the mass flow controller 36. The raw material gasses and the reaction gas are supplied over the base substrate 2 through the nozzle 37. After the vacuum pressure in the plasma chamber 19 is stabilized, the plasma (power of 1.4 W/cm$^2$) is generated by the high frequency power source 38 (13.56 MHz) between the electrode 39 and the substrate holder 20 to form the dielectric layer 44 over the whole surface of the base substrate 1 carrying the metal electrode layer 43. Since a film forming rate of the (Ba$_{1-x}$Sr$_x$)TiO$_3$ film by this plasma CVD method is about 0.18 μm, the dielectric layer 44 having the thickness of about 0.9 μm is formed by 5 minutes growth. Thereafter, the supply of the raw material gasses and the reaction gas was stopped, the gate 18 is opened and the substrate-fixing plate 2 is transferred to the substrate holder 6 by the transfer arm 21.

The substrate holder 6 is half turned by the motor 17 so that the substrate-fixing plate 2 is transferred on the side of gate 8. Thereafter, the gate 8 is opened, and the substrate-fixing plate 2 is transferred onto the substrate holder 10 in the sputtering chamber 9 by the transfer arm 5. Before this step, the substrate holder 10 is already half turned by the motor 40 and therefore, the substrate-fixing plate 2 is placed on the metal mask 12, and the base substrate 1 is intimately contacted to the metal mask 12. The gate 8 is closed, and the sputtering chamber 9 is evacuated to 1×10$^{-4}$ Pa. Then, the argon gas the flow rate of which is adjusted by the mass flow controller 14 is supplied in the sputtering chamber 9. While maintaining the pressure in the sputtering chamber 9 at 1 Pa, the plasma (power of 0.8 W/cm$^2$) is generated on the nickel target 15 by the high frequency power source 16 (13.56 MHz) to form the patterned nickel metal electrode layer 45 the pattern of which is shifted from the patterned metal electrode layer 43 as shown in FIG. 2.

The above procedures are repeated 14 times to form the metal electrode layers and the dielectric layers alternately, whereby 13 dielectric layers are formed.

After lamination, the substrate-fixing plate 2 carrying the base substrate 1 is transferred from the substrate holder 6 to the pre-evacuating room 41 by the transfer arm 21. In the pre-evacuating room 41, the base substrate 1 is cooled to room temperature and transferred outside the apparatus.

Then, the base substrate carrying the alternately laminated metal electrode layers and dielectric layers is cut in a size of 3.2 mm×1.6 mm, so that the every other metal electrode layers are exposed on each of the cut walls as shown in FIG. 2. The size of each cut electrode is 3.0 mm×1.4 mm. On each of the cut walls on which the edge faces of the metal electrode layers are exposed, a silver external electrode 49 or 50 is coated and baked to electrically connect the internal electrodes and the respective external electrodes.

The capacity of the obtained laminated thin film capacitor was 2 μF.

To evaluate the properties of the dielectric layer, a nickel electrode layer 52 is formed on an alumina substrate 51 and a single dielectric layer 53 of $(Ba_{1-x}Sr_x)TiO_3$ is formed on the nickel layer. On the dielectric layer 53, an upper nickel electrode layer 54 is formed.

The electrical properties of this thin film capacitor were measured between the electrode 52 and the electrode 54.

When the dielectric properties were measured using a LCR meter at 1 kHz at room temperature, the dielectric constant was 4500, the dielectric loss was 0.7%, and the insulation resistance was $10^9$ Ω·cm or larger.

The dielectric layer was analyzed by the X-ray diffraction and reflective high energy electron beam diffraction (RHEED) to find that the layer had the perovskite crystal structure preferentially orientated in the (100) plane.

It is assumed that, since the dielectric constant of $BaTiO_3$ is larger in the a axis than in the c axis, the specific dielectric constant of $(Ba_{1-x}Sr_x)TiO_3$ was large.

The composition of the dielectric layer was analyzed by an X-ray microanalyzer to find that it was $(Ba_{0.6}Sr_{0.4})TiO_3$.

By the above process, some laminate thin film capacitors having various compositions were produced by changing the evaporation temperatures of the raw materials, and the substrate temperature as shown in Table 1, while the thickness of each dielectric layer (0.9 μm), the thickness of each electrode layer (0.05 μm) and the number of laminated layers (14 layers) were not changed.

The compositions of the dielectric layers and the electrical properties of the produced capacitors are shown in Table 1.

nated thin film capacitor having the desired dielectric properties can be produced by controlling the composition of the dielectric layers.

When the substrate temperature is changed, the laminated thin film capacitors having good dielectric properties can be obtained in the temperature range between 550° C. and 750° C., while the dielectric properties are deteriorated outside this substrate temperature range. Accordingly, the preferred temperature condition is from 550° C. to 750° C. for the production of the laminate thin film capacitor comprising the $(Ba_{1-x}Sr_x)TiO_3$ dielectric layers.

Comparing the laminate thin film capacitor of the present invention with the conventional sintered type laminate capacitor, the capacitor having the same capacity can be obtained by the smaller number of laminated layers in the present invention. That is, when the number of the laminated layer is the same, the capacitor of the present invention has the larger capacity than the conventional one, because the dielectric layers produced by the plasma CVD method are thinner and denser than those formed by the conventional sintering method.

In the same manner as above except that the film formation time, the layer thickness and/or the number of laminated layers are changed as shown in Table 2, some capacitors are produced from the same raw materials, and their electrical properties are measured. The common conditions are:

the evaporation temperatures of $Ba(C_{11}H_{19}O_2)_2$, $Sr(C_{11}H_{19}O_2)_2$ and $Ti(C_3H_7O)_4$ of 230° C., 240° C. and 50° C., respectively, the substrate temperature of 650° C., the composition of the dielectric layer of $Ba_{0.6}Sr_{0.4}TiO_3$.

The dielectric constant was 4500 in all of the capacitors. Other results are shown in Table 2.

TABLE 2

| Sample No. | Thickness of dielectric layer (μm) | Thickness of electrode layer (μm) | No. of laminated layers | Capacity of capacitor (μF) | Dielectric loss (%) |
|---|---|---|---|---|---|
| 1 | 0.9 | 0.05 | 14 | 2 | 0.7 |
| 8 | 0.3 | 0.05 | 6 | 2 | 0.8 |
| 9 | 0.05 | 0.01 | 5 | 10 | 0.6 |
| 10 | 0.04 | 0.01 | 5 | 0.03 | 2.5 |
| 11 | 3 | 0.2 | 52 | 2 | 0.5 |
| 12 | 4 | 0.05 | 30 | 1 | 0.9 |
| 13 | 0.9 | 0.008 | 10 | 0.08 | 4.0 |
| 14 | 0.7 | 0.3 | 5 | 0.02 | 2.0 |

TABLE 1

| Sample No. | Evaporation temp. (°C.) | | | Substrate temp. °C. | x in $Ba_{1-x}Sr_x$-$TiO_3$ | Dielectric constant | Capacity (μF) | Dielectric loss (%) | Insulation resistance (Ω·cm) |
|---|---|---|---|---|---|---|---|---|---|
| | $Ba(C_{11}H_{19}O_2)_2$ | $Sr(C_{11}H_{19}O_2)_2$ | $Ti(C_3H_7O)_4$ | | | | | | |
| 1 | 230 | 240 | 50 | 650 | 0.4 | 4500 | 2 | 0.7 | $>10^9$ |
| 2 | 235 | — | 49 | 550 | 0.0 | 1800 | 0.8 | 0.9 | $>10^9$ |
| 3 | 225 | 240 | 50 | 600 | 0.2 | 2800 | 1.3 | 0.7 | $>10^9$ |
| 4 | 235 | 232 | 50 | 650 | 0.7 | 2600 | 1.2 | 0.8 | $>10^9$ |
| 5 | — | 240 | 52 | 750 | 1.0 | 300 | 0.1 | 1.0 | $>10^9$ |
| 6 | 230 | 240 | 50 | 500 | 0.4 | 340 | 0.02 | 4.0 | ca. $10^7$ |
| 7 | 230 | 240 | 50 | 800 | 0.4 | 700 | 0.4 | 6.0 | ca. $10^4$ |

From the above results, it is understood that the atomic ratio of Ba to Sr can be changed by changing the evaporation temperatures of the raw materials. This means that a lami- From the above results, it is understood that, when the thickness of the dielectric layer is smaller than 0.05 μm, any sufficient capacity is not achieved. When this thickness is larger than 3 μm, the superiority of the capacitor of the present invention is not found while the capacitor has the sufficient properties. Therefore, the preferred thickness of the dielectric layer is from 0.05 to 3 μm.

When the thickness of the metal electrode layer is less than 0.01 μm, the capacitor has inferior conductivity so that desired capacity is not obtained. When this thickness exceeds 0.2 μm, a difference of total thickness between the center part and the peripheral part becomes large as the number of the laminated layers increases, so that cracks tend to occur, and the conductivity is lost. Therefore, the preferred thickness of the metal electrode layer is from 0.01 to 0.2 μm.

While $Ba(C_{11}H_{19}O_2)_2$, $Ti(C_3H_7O)_4$ and $Sr(C_{11}H_{19}O_2)_2$ are used as the Ba, Ti and Sr raw materials in the above examples, it is possible to form the thin film of $(Ba_{1-x}Sr_x)TiO_3$ having the perovskite crystal structure which is preferentially orientated in the (100) plane, when a β-diketone-metal complex or a metal alkoxide is used as the raw material.

In the above examples, the oxygen gas is used as the reaction gas, the thin film of $(Ba_{1-x}Sr_x)TiO_3$ having the perovskite crystal structure which is preferentially orientated in the (100) plane can be formed when $N_2O$ or $H_2O$ is used as the reaction gas.

Table 3 shows the film formation conditions and the electrical properties of the produced capacitors, when $Ba(C_{11}H_{19}O_2)_2$, $Sr(C_{11}H_{19}O_2)_2$, and $Ti(C_3H_7O)_4$, $Ti(C_{11}H_{19}O_2)_2$-$(C_3H_7O)_2$ or $Ti(C_5H_7O_2)_4$ were used as the raw materials, and $O_2$, $N_2O$ or $H_2O$ was used as the reaction gas. The common conditions are the thickness of dielectric layer of 0.9 μm, the thickness of electrode layer of 0.05 μm, the number of laminated layers of 14, and the substrate temperature of 650° C.

method. The present invention is not limited to this embodiment. When other metal is used as the external electrode or the external electrode is formed by other method such as vacuum deposition, sputtering or plating, the laminated thin film capacitor having the same characteristics as above can be produced.

EXAMPLE 2

In this example, a laminated thin film capacitor having the structure of FIG. 2 is produced using the apparatus of FIG. 1.

A laminated thin film capacitor is produced in substantially the same manner as in Example 1 except that dielectric layers are formed on the respective metal electrode layers by the following method.

On the substrate holder 20 in the plasma CVD chamber 19, the substrate-fixing plate 2 is transferred by the transfer arm 21. The substrate holder 20 is beforehand heated to 680° C. by the lamp heater 22. Then, the gate 18 is closed, the plasma CVD chamber 19 is evacuated to 1 Pa, and the substrate holder 20 is rotated at 120 rpm by the motor 23. In the evaporation vessels 24, 26, 28 and 30, the raw material 25 (lead dipivaloylmethane: $Pb(C_{11}H_{19}O_2)_2$), the raw material 27 (isopropoxytitanium: $Ti(C_3H_7O)_4$), the raw material 29 (magnesium acetylacetonate $(Mg(C_5H_7O_2)_2.H_2O)$, and the raw material 31 (pentaethoxyniobium $(Nb(OC_2H_5)_5)$ are beforehand charged, respectively and heated to and maintained at 145° C., 50° C., 220° C. and 60° C., respectively.

Vapors of $Pb(C_{11}H_{19}O_2)_2$, $Ti(C_3H_7O)_4)$, $Mg(C_5H_7O_2)_2.H_2O$ and $Nb(OC_2H_5)_5$ are supplied into the plasma CVD chamber 19 by flowing the argon carrier gas in

TABLE 3

| Sample No. | Ba source | Evap. temp. (°C.) | Sr source | Evap. temp. (°C.) | Ti source | Evap. temp. (°C.) | Reaction gas | Flow rate (cm³/min.) | x in $Ba_{1-x}Sr_xTiO_3$ | Capacity (μF) | Dielectric loss(%) |
|---|---|---|---|---|---|---|---|---|---|---|---|
| 15 | $Ba(C_{11}H_{19}O_2)_2$ | 230 | $Sr(C_{11}H_{19}O_2)_2$ | 240 | $Ti(C_{11}H_{19}O_2)_2$—$(C_3H_7O)_2$ | 150 | $O_2$ | 50 | 0.4 | 2 | 0.6 |
| 16 | ↑ | ↑ | ↑ | 238 | ↑ | ↑ | $N_2O$ | 40 | 0.3 | 1.8 | 0.5 |
| 17 | ↑ | ↑ | ↑ | 230 | $Ti(C_5H_7O_2)_4$ | 50 | $H_2O$ | 35 | 0.2 | 1.5 | 0.8 |
| 18 | ↑ | ↑ | ↑ | 230 | ↑ | ↑ | $O_2$ | 50 | 0.2 | 1.4 | 0.6 |

From the above results, it is understood that when the β-diketone-metal complex or the metal alkoxide is used as the raw material and $O_2$, $N_2O$ or $H_2O$ is used as the reaction gas, the dielectric layers which are preferentially orientated in the (100) plane and have the same dielectric properties as above can be formed.

In the above example, the nickel thin film formed by sputtering is used as the metal electrode layer, but the present invention is not limited to this film formation method or this kind of the metal electrode layer. When other thin film forming method such as vacuum deposition is used, or other electrode metal such as palladium, palladium/silver alloy, platinum or copper is used, the laminated thin film capacitor having the same characteristics as above can be produced.

In the above example, the silver electrode is used as the external electrode which is formed by the coating-baking the evaporation vessels 24, 26, 28 and 30 respectively by adjusting the flow rates of the carrier gas at 35 cm³/min., 20 cm³/min. 30 cm³/min. and 15 cm³/min. respectively by the mass flow controllers 32, 33, 34 and 35, respectively. Further, the reaction gas (oxygen gas) is supplied into the plasma CVD chamber 19 by adjusting its flow rate at 100 cm³/min. by the mass flow controller 36. The raw material gasses and the reaction gas are supplied over the base substrate 2 through the nozzle 37. After the vacuum pressure in the plasma chamber 19 is stabilized, the plasma (power of 1.4 W/cm²) is generated by the high frequency power source 38 (13.56 MHz) between the electrode 39 and the substrate holder 20 to form the dielectric layer 44 over the whole surface of the base substrate 1 carrying the metal electrode layer 43. Since a film forming rate of the $Pb[(Mg_{1/3}Nb_{2/3})_{1-x}Ti_x]O_3$ film by this plasma CVD method is about 0.15 μm/min., the dielectric layer 44 having the thickness of about 0.6 µm is formed by 4 minute growth. Thereafter, 14 dielectric layers are formed in the similar manner to that in Example 1 to obtain a laminated thin film capacitor.

The capacity of the obtained laminated thin film capacitor was 7 µF.

To evaluate the properties of the dielectric layer, a nickel electrode layer 52 is formed on an alumina substrate 51 and a single dielectric layer 53 of $Pb[(Mg_{1/3}Nb_{2/3})_{1-x}Ti_x]O_3$ is formed on the nickel layer. On the dielectric layer 53, an upper nickel electrode layer 54 is formed.

The electrical properties of this thin film capacitor were measured between the electrode 52 and the electrode 54.

When the dielectric properties were measured using a LCR meter at 1 kHz at room temperature, the specific dielectric constant was 9800, the dielectric loss was 0.8%, and the insulation resistance was $10^9$ Ω·cm or larger.

The dielectric layer was analyzed by the X-ray diffraction to find that the layer had the perovskite crystal structure.

The composition of the dielectric layer was analyzed by an X-ray microanalyzer to find that it was $Pb[(Mg_{1/3}Nb_{2/3})_{0.7}Ti_{0.3}]O_3$.

By the above process, some laminated thin film capacitors having various compositions were produced by changing the evaporation temperatures of the raw materials, and the substrate temperature as shown in Table 4, while the thickness of each dielectric layer (0.6 µm), the thickness of each electrode layer (0.05 µm) and the number of laminated layers (14 layers) were not changed.

The compositions of the dielectric layers and the electrical properties of the produced capacitors are shown in Table 4.

invention with the conventional sintered type laminate capacitor, the capacitor having the same capacity can be obtained by the smaller number of laminated layers in the present invention. That is, when the number of the laminated layer is the same, the capacitor of the present invention has the larger capacity than the conventional one, because the dielectric layers produced by the plasma CVD method are thinner and denser than those formed by the conventional sintering method.

In the same manner as above except that the film formation time, the layer thickness and/or the number of laminated layers are changed as shown in Table 5, some capacitors are produced from the same raw materials, and their electrical properties are measured. The common conditions are:

The evaporation temperatures of $Pb(C_{11}H_{19}O_2)_2$, $Ti(C_3H_7O)_4$, $Mg(C_5H_7O_2)_2 \cdot H_2O$ and $Nb(OC_2H_5)_5$ of 145° C., 50° C., 220° C. and 60° C., respectively;

the substrate temperature of 600° C.;

the composition of the dielectric layer of $Pb[(Mg_{1/3}Nb_{2/3})_{0.7}Ti_{0.3}]O_3$.

The dielectric constant was 9800 in all of the capacitors. Other results are shown in Table 5.

TABLE 5

| Sample. No. | Thickness of dielectric layer (µm) | Thickness of electrode layer (µm) | No. of laminated layers | Capacity of capacitor (µF) | Dielectric loss (%) |
|---|---|---|---|---|---|
| 21 | 0.6 | 0.05 | 4 | 7 | 0.8 |
| 28 | 3 | 0.2 | 50 | 5 | 0.7 |
| 29 | 4 | 0.2 | 20 | 1 | 0.6 |
| 30 | 0.04 | 0.01 | 6 | 0.07 | 1.2 |

TABLE 4

| Sample No. | Evaporation temp. (°C.) | | | | Substrate temp. (°C.) | x in the formula (1)*[1] | Dielectric constant | Capacity (µF) | Dielectric loss (%) | Insulation resistance (Ω.cm) |
|---|---|---|---|---|---|---|---|---|---|---|
| | Pb-$(C_{11}H_{19}O_2)_2$ | Ti-$(C_3H_7O)_4$ | Mg-$(C_5H_7O_2)_2$—$H_2O$ | Nb-$(OC_2H_5)_5$ | | | | | | |
| 21 | 145 | 50 | 220 | 60 | 600 | 0.3 | 9800 | 7 | 0.8 | >$10^9$ |
| 22 | 147 | 45 | 225 | 64 | 750 | 0.1 | 14500 | 10 | 0.9 | >$10^9$ |
| 23 | 145 | 54 | 210 | 54 | 450 | 0.8 | 2800 | 2 | 0.9 | >$10^9$ |
| 24 | 145 | — | 220 | 60 | 600 | 0.0 | 10500 | 7 | 0.9 | >$10^9$ |
| 25 | 145 | 55 | — | — | 580 | 1.0 | 380 | 0.3 | 0.8 | >$10^9$ |
| 26 | 145 | 50 | 220 | 60 | 400 | 0.3 | 200 | 0.06 | 4.0 | ca. $10^3$ |
| 27 | 145 | 50 | 220 | 60 | 800 | 0.3 | 4400 | 3 | 8.0 | ca. $10^4$ |

Note:
Formula (1): $Pb[(Mg_{1/3}Mb_{2/3})_{1-x}Ti_x]O_3$.?

From the above results, it is understood that the atomic composition of Pb, Mg, Nb and Ti can be changed by changing the evaporation temperatures of the raw materials. This means that a laminated thin film capacitor having the desired dielectric properties can be produced by controlling the composition of the dielectric layers.

When the substrate temperature is changed, the laminated thin film capacitors having good dielectric properties can be obtained in the temperature range between 450° C. and 750° C., while the dielectric properties are deteriorated outside this substrate temperature range. Accordingly, the preferred temperature condition is from 450° C. to 750° C. for the production of the laminate thin film capacitor comprising the $Pb[(Mg_{1/3}Nb_{2/3})_{1-x}Ti_x]O_3$ dielectric layers.

Comparing the laminate thin film capacitor of the present

TABLE 5-continued

| Sample. No. | Thickness of dielectric layer (µm) | Thickness of electrode layer (µm) | No. of laminated layers | Capacity of capacitor (µF) | Dielectric loss (%) |
|---|---|---|---|---|---|
| 31 | 0.05 | 0.01 | 6 | 30 | 0.7 |
| 32 | 0.6 | 0.008 | 10 | 0.01 | 0.9 |
| 33 | 0.6 | 0.03 | 5 | 0.02 | 1.7 |

From the above results, it is understood that, when the thickness of the dielectric layer is smaller than 0.05 µm, any sufficient capacity is not achieved. When this thickness is larger than 3 μm, the superiority of the capacitor of the present invention is not found while the capacitor has the sufficient properties. Therefore, the preferred thickness of the dielectric layer is from 0.05 to 3 μm.

When the thickness of the metal electrode layer is smaller than 0.01 μm, the capacitor has inferior conductivity so that desired capacity is not obtained. When this thickness exceeds 0.2 μm, a difference of total thickness between the center part and the peripheral part becomes large as the number of the laminated layers increases, so that cracks tend to occur, and the conductivity is lost. Therefore, the preferred thickness of the metal electrode layer is from 0.01 to 0.2 μm.

While $Pb(C_{11}H_{19}O_2)_2$, $Ti(C_3H_7O)_4$, $Mg(C_5H_7O_2)_2 \cdot H_2O$ and $Nb(OC_2H_5)_5$ are used as the Pb, Ti, Mg and Nb raw materials in the above examples, it is possible to form the thin film of $Pb[(Mg_{1/3}Nb_{2/3})_{1-x}Ti_x]O_3$ having the perovskite crystal structure, when a β-diketone-metal complex or a metal alkoxide is used as the raw material.

In the above examples, the oxygen gas is used as the reaction gas, the thin film of $Pb[(Mg_{1/3}Nb_{2/3})_{1-x}Ti_x]O_3$ having the perovskite crystal structure can be formed when $N_2O$ or $H_2O$ is used as the reaction gas.

Table 6 shows the film formation conditions and the electrical properties of the produced capacitors, when $Pb(C_{11}H_{19}O_2)_2$, $Pb(C_2H_5)_4$, $Ti(C_3H_7O)_4$, $Ti(C_{11}H_{19}O_2)_2(C_3H_7O)_2$, $Mg(C_5H_7O_2)_2 \cdot H_2O$, $Mg(C_7H_{15}COO)_2$, $Nb(OC_2H_5)_5$ or $Nb(C_{11}H_{19}O_2)_2Cl_3$ were used as the raw materials, and $O_2$, $N_2O$ or $H_2O$ was used as the reaction gas. The common conditions are the thickness of dielectric layer of 0.6 μm, the thickness of electrode layer of 0.05 μm, the number of laminated layers of 14, and the substrate temperature of 600° C.

or other electrode metal such as palladium, palladium/silver alloy, platinum or copper is used, the laminated thin film capacitor having the same characteristics as above can be produced.

In the above example, the silver electrode is used as the external electrode which is formed by the coating-baking method. The present invention is not limited to this embodiment. When other metal is used as the external electrode or the external electrode is formed by other method such as vacuum deposition, sputtering or plating, the laminated thin film capacitor having the same characteristics as above can be produced.

What is claimed is:

1. A laminated thin film capacitor comprising a substrate, at least two metal electrode layers, at least one dielectric crystal layer having a crystal axis, which is formed by a plasma CVD method and the crystal axis of which is oriented in a direction perpendicular to the plane of said metal electrode layers and in the (100) plane, and a pair of external electrodes which are placed on respective side walls of said capacitor, wherein said metal electrode layers and said at least one dielectric layer are laminated alternately on said substrate, and edge surfaces of every other metal electrode layer is exposed on each of the side walls of said capacitor, at least one of said substrate and said electrodes having a non-(100) orientation.

2. The laminated thin film capacitor according to claim 1, wherein said dielectric layer consists of $(Ba,Sr)TiO_3$ having a cubic system perovskite crystal structure.

TABLE 6

| Sample No. | Pb source | Evap. temp. (°C.) | Ti source | Evap. temp. (°C.) | Mg source | Evap. temp. (°C.) | Nb source | Evap. temp. (°C.) |
|---|---|---|---|---|---|---|---|---|
| 34 | $Pb(C_{11}H_{19}O_2)_2$ | 145 | $Ti(C_3H_7O)_4$ | 50 | $Mg(C_5H_7O_2)_2 \cdot H_2O$ | 220 | $Nb(C_{11}H_{19}O_2)_2Cl_3$ | 140 |
| 35 | ↑ | ↑ | $Ti(C_{11}H_{19}O_2)_2—(C_3H_7O)_2$ | 142 | ↑ | ↑ | ↑ | ↑ |
| 36 | $Pb(C_2H_5)_4$ | 20 | ↑ | ↑ | ↑ | ↑ | ↑ | ↑ |
| 37 | ↑ | ↑ | ↑ | ↑ | $Mg(C_7H_{15}COO)_2$ | 340 | $Nb(OC_2H_5)_5$ | 60 |

| Sample No. | Reaction gas | Flow rate (cm³/min.) | x in the formula (2)*[1] | Capacity (μF) | Dielectric loss (%) |
|---|---|---|---|---|---|
| 34 | $O_2$ | 100 | 0.4 | 5 | 0.7 |
| 35 | $N_2O$ | 40 | 0.5 | 4 | 0.6 |
| 36 | $H_2O$ | 60 | 0.5 | 4 | 0.7 |
| 37 | $O_2$ | 100 | 0.3 | 7 | 0.8 |

Note: Formula (2): $Pb[(Mg_{1/3}Nb_{2/3})_{1-x}Ti_x]O_3$.

From the above results, it is understood that when the β-diketone-metal complex or the metal alkoxide is used as the raw material and $O_2$, $N_2O$ or $H_2O$ is used as the reaction gas, the dielectric layers have the same dielectric properties as above can be formed.

In the above example, the nickel thin film formed by sputtering is used as the metal electrode layer, but the present invention is not limited to this film formation method or this kind of the metal electrode layer. When other thin film forming method such as vacuum deposition is used, 3. The laminated thin film capacitor according to claim 1, wherein said $(Ba,Sr)TiO_3$ has a composition of $(Ba_{1-x}Sr_x)TiO_3$ in which x is from 0 to 1.0.

4. The laminated thin film capacitor according to claim 2, wherein said cubic system perovskite crystal structure has an a axis which is oriented in a direction perpendicular to the plane of said metal electrode layers and is in the (100) plane.

* * * * *